United States Patent
Maise et al.

(10) Patent No.: US 10,382,224 B2
(45) Date of Patent: Aug. 13, 2019

(54) CONTROL DEVICE FOR CONNECTING A CAN BUS TO A RADIO NETWORK, AND MOTOR VEHICLE HAVING SUCH A CONTROL DEVICE

(71) Applicant: Dr. Ing. h.c. F. Porsche Aktiengesellschaft, Stuttgart (DE)

(72) Inventors: Timo Maise, Ludwigsburg (DE); Paul Behrendt, Leonberg (DE); Kai Schneider, Neuffen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 87 days.

(21) Appl. No.: 15/085,355

(22) Filed: Mar. 30, 2016

(65) Prior Publication Data

US 2016/0294578 A1    Oct. 6, 2016

(30) Foreign Application Priority Data

Apr. 2, 2015    (DE) ........................ 10 2015 105 112

(51) Int. Cl.
 *H04L 12/40*    (2006.01)
 *G06F 13/42*    (2006.01)
(52) U.S. Cl.
 CPC ...... *H04L 12/4011* (2013.01); *G06F 13/4286* (2013.01); *H04L 12/40013* (2013.01); *Y02D 10/14* (2018.01); *Y02D 10/151* (2018.01)
(58) Field of Classification Search
 None
 See application file for complete search history.

(56) References Cited

U.S. PATENT DOCUMENTS

2005/0273210 A1* 12/2005 Pfaffeneder ......... B60R 16/0315
                                                    701/1
2006/0162986 A1    7/2006 Disser
(Continued)

FOREIGN PATENT DOCUMENTS

| DE | 4126850 | 2/1993 |
|---|---|---|
| DE | 102011051758 | 1/2013 |
| KR | 101472896 | 12/2014 |

OTHER PUBLICATIONS

NXP B.V., "TJA1041A: High-Speed CAN Transceiver", Rev. 04—Jul. 29, 2008.*

(Continued)

*Primary Examiner* — Farley Abad
*Assistant Examiner* — Dayton Lewis-Taylor
(74) *Attorney, Agent, or Firm* — RatnerPrestia

(57) ABSTRACT

A control device and corresponding motor vehicle for connecting a CAN bus to a radio network, having the following features: the control device includes a wireless controller, a microcontroller, a first CAN transceiver and a second CAN transceiver; the microcontroller is connected, on the one hand, to the wireless controller and, on the other hand, to the CAN transceivers; the first CAN transceiver is connected to the second CAN transceiver; the first CAN transceiver is configured in such a manner that it suppresses transmission via the CAN bus and supports reception via the CAN bus in a normal mode and supports transmission and reception in a diagnostic mode; and the second CAN transceiver is configured in such a manner that it changes the first CAN transceiver from the normal mode to the diagnostic mode when the second CAN transceiver receives a wake-up frame via the CAN bus.

8 Claims, 3 Drawing Sheets

(56) References Cited

U.S. PATENT DOCUMENTS

| | | |
|---|---|---|
| 2010/0174439 A1 | 7/2010 | Petricoin |
| 2010/0306457 A1 | 12/2010 | Wilson |
| 2013/0227648 A1 | 8/2013 | Ricci |
| 2014/0259143 A1* | 9/2014 | Kuhnl ............... G08C 25/00 726/11 |
| 2015/0089236 A1 | 3/2015 | Han |
| 2015/0172306 A1 | 6/2015 | Kim |
| 2016/0124488 A1* | 5/2016 | Haentzschel ......... G06F 1/3253 713/323 |
| 2017/0005828 A1* | 1/2017 | Gino .................. H04L 12/12 |

OTHER PUBLICATIONS

Elmos Semiconductor AG, "HS CAN Transceiver for Partial Networking—E520.13", Dec. 4, 2012.*
German Search Report for German Application No. 102015105112.5 dated Feb. 16, 2016, including partial English Language translation.

* cited by examiner

CONTROL DEVICE FOR CONNECTING A CAN BUS TO A RADIO NETWORK, AND MOTOR VEHICLE HAVING SUCH A CONTROL DEVICE

CROSS-REFERENCE TO RELATED APPLICATION

This application claims priority to German Patent Application No. DE 10 2015 105 112.5, filed Apr. 2, 2015, which is incorporated by reference herein in its entirety.

FIELD OF THE INVENTION

The present invention relates to a control device for connecting a CAN bus to a radio network. The present invention also relates to a corresponding motor vehicle.

BACKGROUND OF THE INVENTION

A widespread vehicle area network (VAN) which is internationally standardized according to ISO 11898 is familiar to a person skilled in the art as a controller area network (CAN). Wireless interfaces for such a vehicle area network are also known. However, an unauthorized third party can also access the vehicle area network via such an interface and can thus interfere with or paralyze the vehicle area network. It is therefore sometimes proposed to prevent write access (transmit, Tx) to the vehicle area network via the interface. However, no diagnoses or network management applications can be executed in this case via the interface.

DE 10 2011 051 758 A1, which is incorporated by reference herein, discloses a CAN bus adapter for connection to the CAN bus of a motor vehicle. The CAN bus adapter has at least one first interface for connection to the CAN bus of a motor vehicle and at least one second interface for wireless or wired connection to a computer or a device of that kind. The CAN bus adapter is distinguished by the fact that at least one buffer is provided and is designed to store the CAN bus data received from the first interface according to the first-in-first-out principle if necessary.

US 2010/0306457 A1, which is incorporated by reference herein, relates to a microcontroller having a random access memory and a CAN controller which has a control unit which receives an assembled CAN message, the control unit being set up to generate a buffer descriptor table entry using the assembled CAN message and to store this buffer descriptor table entry in the random access memory. The buffer descriptor table entry comprises at least one message identifier and useful data from the CAN message and information relating to a subsequent buffer descriptor table entry.

Finally, DE 41 26 850 A1, which is incorporated by reference herein, proposes a circuit arrangement for adapting a data bus controller module to a symmetrical bus line, in particular according to the CAN bus system, in order to add a reactance, which has been inserted into the transmission signal path from the controller module to the bus line and has a low shunt capacitance and a controllably variable inductance value, and a control circuit for temporally changing the inductance acting on the transmission signal current on the basis of signal edges of the transmission signal.

US 2013/0227648 A1, which is incorporated by reference herein, and US 2010/0174439 A1, which is also incorporated by reference herein, discuss similar apparatuses.

SUMMARY OF THE INVENTION

Described herein is a control device for connecting a CAN bus to a radio network and a motor vehicle having such a control device.

One advantage of this solution is that the microcontroller can write authorized messages for diagnosis to the CAN bus. If an attacker manages to initiate the transmission of unauthorized messages or error frames by the microcontroller, they are not transmitted on the CAN bus unless the vehicle is in production or in the workshop and a diagnostic request has already been transmitted.

The first CAN transceiver can therefore have an activation input which is connected to a control output of the second CAN transceiver which is referred to as a blocking output below. In this connection, the CAN transceivers can be configured in such a manner that the wake-up frame activates the blocking output of the second CAN transceiver and therefore activates the diagnostic mode of the first CAN transceiver via the activation input. As a result, a firewall against the unauthorized transmission of CAN messages in the normal mode outside the workshop and production results as it were from the combination according to aspects of the invention of the two CAN transceivers.

The proposed CAN Tx firewall can be used to implement diagnosis for a vehicle control device with a wireless interface without thereby making it possible to manipulate the vehicle electronics by means of attacks via the wireless interface.

In one preferred embodiment, the microcontroller and the second CAN transceiver have a serial peripheral interface (SPI). In this constellation, the microcontroller 14 should expediently be programmed in such a manner that it configures the wake-up frame during initialization via the serial peripheral interface. This configuration opens up numerous adjustment possibilities.

An advantageous choice for the first CAN transceiver is the TJA1041 model from NXP Semiconductors. A CAN transceiver of this type provides the control device with a particularly high transmission speed of up to 1 Mbit/s with pronounced electromagnetic compatibility and a low energy consumption.

With regard to the second CAN transceiver, the E520.13 model from ELMOS Semiconductor AG should be borne in mind, in particular, which model is distinguished by its selective wake-up function which can be configured by SPI according to ISO 11898-6.

BRIEF DESCRIPTION OF THE DRAWING

One exemplary embodiment of the invention is illustrated in the drawing and is described in more detail below.

DETAILED DESCRIPTION OF THE INVENTION

Figure 1:
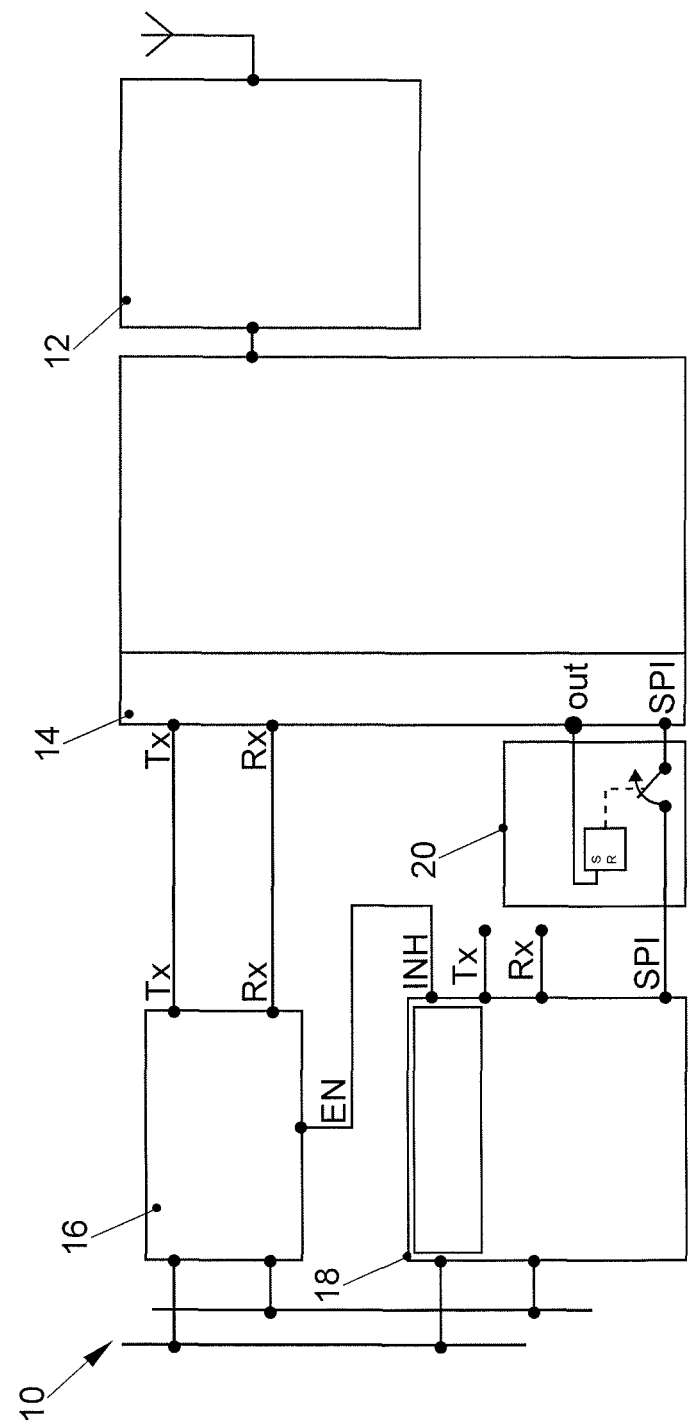
FIG. 1 shows the simplified circuit diagram of a control device according to aspects of the invention.
Figure 2:
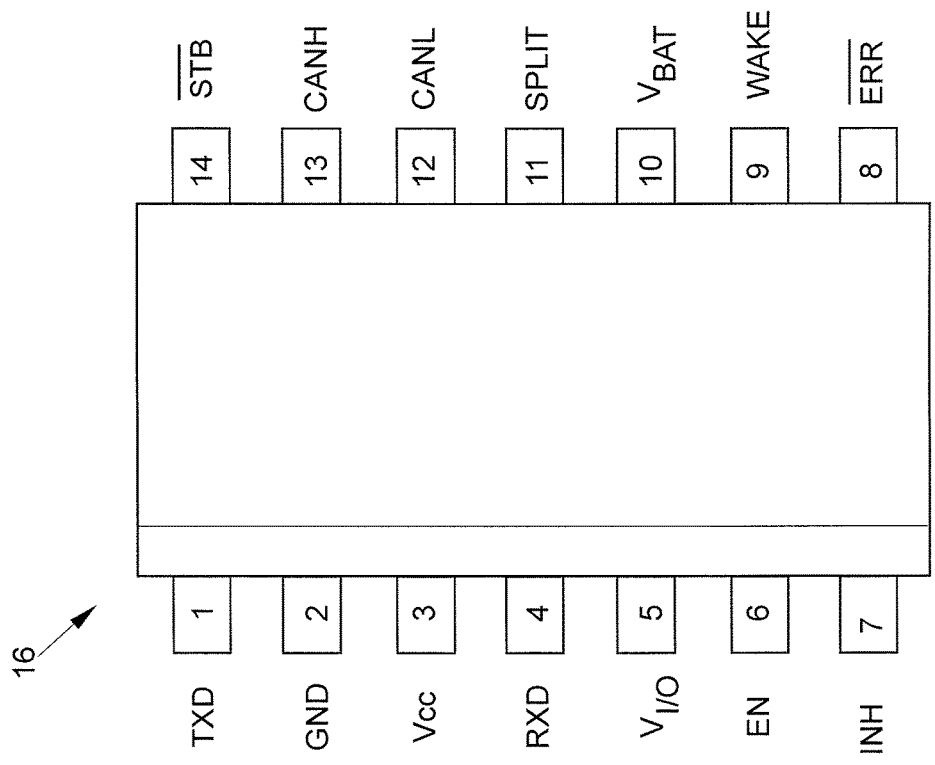
FIG. 2 shows the connection assignment of a first CAN transceiver used in the control device.
Figure 3:
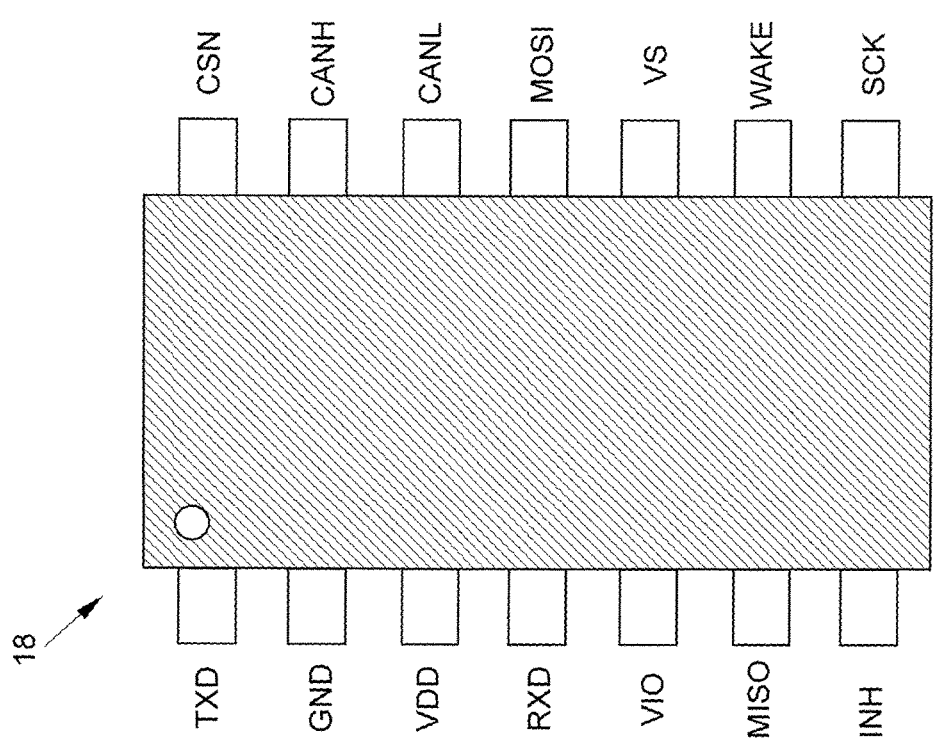
FIG. 3 shows the connection assignment of a second CAN transceiver used in the control device.

FIG. 1 illustrates the fundamental structure of a vehicle control device 10 according to one embodiment of the invention. The control device includes a wireless controller 12, a microcontroller 14, a first CAN transceiver 16, and a second CAN transceiver 18. In contrast to conventional circuits of this type, a second "wake-up" CAN transceiver of the E520.13 type is used according to aspects of the invention in the control device 10 for wireless data transmission in order to avoid manipulation of the CAN bus communication.

CAN messages are transmitted and received via the first CAN transceiver 16 of the TJA1041 type. Apart from the case of diagnosis, this first CAN transceiver 16 suppresses any transmission via the CAN bus (listen-only mode). The output INJ=1 is set only if the second CAN transceiver 18 receives (receive, Rx) the diagnostic request, as a result of which the first CAN transceiver 16 is changed to the diagnostic mode.

In order to set the diagnostic request as a wake-up frame, the microcontroller 14 configures the wake-up frame of the second CAN transceiver 18 via the serial peripheral interface SPI after the ignition has been switched on, that is to say during initialization. The lines of the serial peripheral interface SPI must then be separated in a self-holding manner by a self-holding separation 20 (such as an asynchronous level-controlled flip-flop; e.g., an S/R flip-flop) in order to avoid subsequently changing the wake-up frame. For this purpose, the microcontroller 14 changes the binary output from 0 to 1 at the end of the initialization. As a result, the S/R flip-flop is set from 0 to 1 in a self-holding manner. The lines are separated by transistor circuits when the S/R flip-flop is set. The S/R flip-flop may be an asynchronous level-controlled flip-flop.

What is claimed is:

1. A control device for connecting a controller area network (CAN) bus to a radio network, comprising:
   a wireless controller, a microcontroller, a first CAN transceiver and a second CAN transceiver,
   the microcontroller is connected to the wireless controller and the CAN transceivers,
   the microcontroller and the second CAN transceiver have a serial peripheral interface, wherein the serial peripheral interface is configured for self-holding separation by an asynchronous level-controlled flip-flop,
   the microcontroller has a binary control output (out) which is connected to a set input (S) of the asynchronous level-controlled flip-flop, and the microcontroller controls the separation by the control output (out),
   the first CAN transceiver is connected to the second CAN transceiver,
   the first CAN transceiver is configured to (i) suppress transmission (Tx) via the CAN bus and support reception (Rx) via the CAN bus in a first mode in which CAN transmissions are suppressed, and (ii) support transmission (Tx) and reception (Rx) in a second mode in which CAN transmissions are enabled,
   the second CAN transceiver is configured to change the first CAN transceiver from the first mode to the second mode when the second CAN transceiver receives (Rx) a wake-up frame via the CAN bus,
   the microcontroller is programmed such that it initially configures the wake-up frame via the serial peripheral interface.

2. The control device as claimed in claim 1, wherein:
   the first CAN transceiver has an activation input (EN),
   the second CAN transceiver has a blocking output (INH),
   the activation input (EN) is connected to the blocking output (INH),
   the first CAN transceiver is configured in such a manner that the activation input (EN) activates a diagnostic mode, and
   the second CAN transceiver is configured in such a manner that he wake-up frame activates the blocking output (INH).

3. The control device as claimed in claim 1, wherein:
   the microcontroller is programmed in such a manner that the microcontroller initially configures the wake-up frame via the serial peripheral interface.

4. The control device as claimed in claim 1, wherein the serial peripheral interface includes transistor circuits connected to the asynchronous level-controlled flip-flop such that the transistor circuits cause the separation.

5. The control device as claimed in claim 1, wherein the first CAN transceiver is a TJA1041A.

6. The control device as claimed in claim 1, wherein the second CAN transceiver is an E520.13.

7. The control device as claimed in claim 6, wherein four inputs of the E520.13 implement the serial peripheral interface.

8. A motor vehicle having a control device as claimed in claim 1.

* * * * *